L. E. ARMSTRONG.
SAFE-SAVING DEVICE.
APPLICATION FILED JULY 25, 1918. RENEWED MAY 19, 1919.
1,313,156.
Patented Aug. 12, 1919.
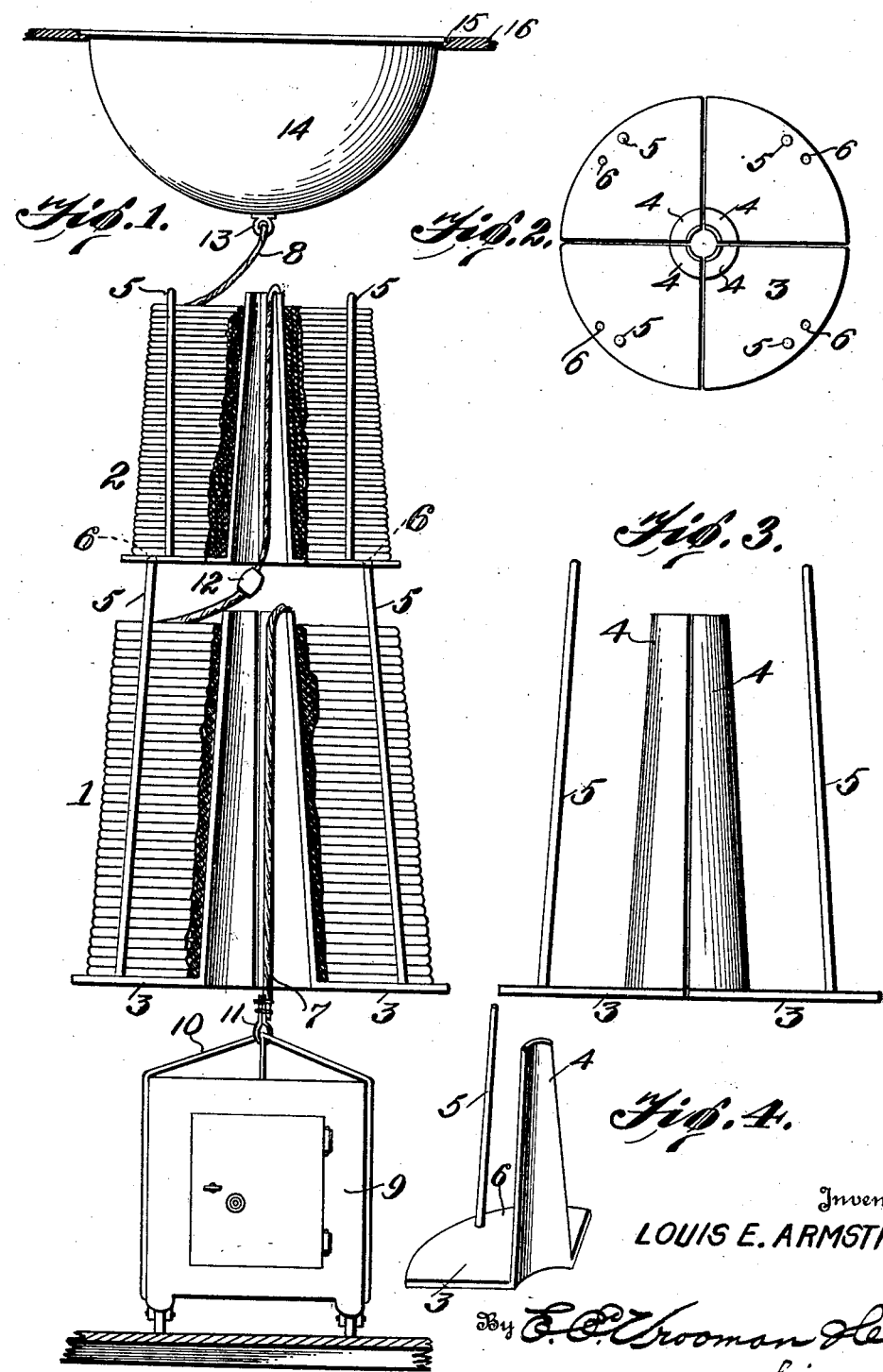
Inventor
LOUIS E. ARMSTRONG

UNITED STATES PATENT OFFICE.

LOUIS EARL ARMSTRONG, OF PENSACOLA, FLORIDA.

SAFE-SAVING DEVICE.

1,313,156.      Specification of Letters Patent.      Patented Aug. 12, 1919.

Application filed July 25, 1918, Serial No. 246,756. Renewed May 19, 1919. Serial No. 298,351.

*To all whom it may concern:*

Be it known that I, LOUIS E. ARMSTRONG, a citizen of the United States of America, residing at 24 West Intendencia St., Pensacola, in the county of Escambia and State of Florida, have invented certain new and useful Improvements in Safe-Saving Devices, of which the following is a specification, reference being had therein to the accompanying drawings.

This invention relates to means for saving a safe, the safe having been carried by a vessel that has been sunk.

The object of my invention is the provision of simple, yet efficient means for locating a safe on a sunken vessel, and then providing means whereby the safe can be raised to the surface.

With this and other objects in view, the invention comprises certain novel constructions and arrangements of parts, as will be fully described in the following specification, and illustrated in the accompanying drawing.

In the accompanying drawing:

Figure 1 is a side view of an apparatus constructed in accordance with the present invention, part of said apparatus being shown in section.

Fig. 2 is a top plan view of one of the spool or core devices, while

Fig. 3 is a view in side elevation of the spool or core device illustrated in Fig. 2.

Fig. 4 is a perspective view of one of the sections of the spool or core device.

Referring to the drawing by numerals, 1 designates the primary spool or core device, 2 the auxiliary spool or core device. As the construction of both of the spool or core devices are similar, it will only be necessary to specifically describe one of the devices.

Referring particularly to Figs. 2 and 3, it will be seen that each spool or core device comprises four similarly constructed sections; each section being composed of a base portion 3, with a vertical portion, and with a guiding and supporting rod 5; this rod 5 is near the outer edge of the base-portion 3, and is of greater height than the vertical portion 4, whereby the rods 5 can be positioned in apertures 6 in the base portions of the auxiliary core device located above the primary core device, Fig. 1; the rods 5 extending into the apertures 6 a sufficient distance to temporarily lock the core devices together, especially when the primary lifting cable 7 and the auxiliary cable 8 are coiled upon the spool or core device, as shown in Fig. 1.

To facilitate the winding of the cables upon the devices, the central body portion of each spool or core device, constituted by the vertical positions 4, is cone-like in structure, being gradually tapered from its bottom to its top, thereby permitting the cable to slip off from the spool or core device.

The primary cable 7 is attached in any suitable manner to the safe 9 by a plurality of surrounding bands, constituting a safe inclosing means; this safe inclosing means is attached at 11 to the primary cable 7; the cable 7 is then passed up through the central part of the primary core device and coiled around the tapering body, constituted by the portions 4, the opposite end of the cable 7 being connected at 12 to the inner end of the auxiliary cable 8; the auxiliary cable 8 is coiled on the auxiliary core or spool device, and the outer end of the cable is fastened in the eye 13 attached to the bottom of the float 14.

The float 14 is mounted in a suitable aperture 15 in the upper deck 16 of the ship, so that when the ship sinks the float 14 will float on the surface, indicating the position of not only the ship, but the sunken safe, and by taking up the float and unwinding cable 8, the heavy cable 7 will be brought to the surface, and then by any suitable means the safe can be raised, said safe being first positioned in the purser's room or cabin in such manner that will allow it being drawn out of the door, and then to the surface, this position of the safe being taken care of at the beginning of the voyage. After the cable of each spool or core device is entirely removed from said device, by reason of the sectional structure of such devices, the sections will fall apart, and move out of the way, and when all of the cables have been drawn or rewound from all of these spool or core devices, all of the sections of such devices will fall away, and clear the cables.

It will be obvious that any number of these spool or core devices may be used, by placing them in tiers, one on the other, as indicated in Fig. 1, whereby any quantity of cable may be used for permitting the efficient operation of the device for saving a safe, even though the ship should sink at a great depth.

What I claim is:

1. A safe saving apparatus, comprising a float, safe attaching means, a sectional core device, and a cable attached to said float and to said safe attaching means and engaging said core devices and holding the sections thereof together.

2. A core device for a safe saving apparatus, comprising a plurality of sections, each section consisting of a base, a vertical portion attached to said base, and a guiding and supporting rod attached to said base.

3. A core device for a safe saving apparatus, including a plurality of sections comprising a core structure, each section provided with a vertical portion constituting a part of the core structure of the device, and guiding and supporting means attached to each section.

4. A core device for a safe saving apparatus, comprising a base, a central tapering portion, and a plurality of guiding and supporting means near the edge of said base and a greater length than the central tapering portion.

5. In an apparatus of the class described, the combination with a float and safe attaching means of a cable connected to said float and to said safe attaching means, and means between the float and the safe attaching means for retaining the cable normally in a coiled position, said retaining means being adapted to entirely clear said cable when the float is raised from its normal position.

6. In an apparatus of the class described, the combination with a float and safe attaching means, of a plurality of core devices, one positioned above the other, one core device having a means extending into a portion of the core devices for temporarily retaining the devices in a stacked position, and means connecting said float and said attaching means, and being wound upon said core devices.

In testimony whereof I hereunto affix my signature.

LOUIS EARL ARMSTRONG.

Copies of this patent may be obtained for five cents each, by addressing the "Commissioner of Patents Washington, D. C."